No. 726,004. PATENTED APR. 21, 1903.
E. G. H. STEIN & J. MANDEL.
COUPLING FOR AIR CONDUITS.
APPLICATION FILED DEC. 6, 1902.
NO MODEL.
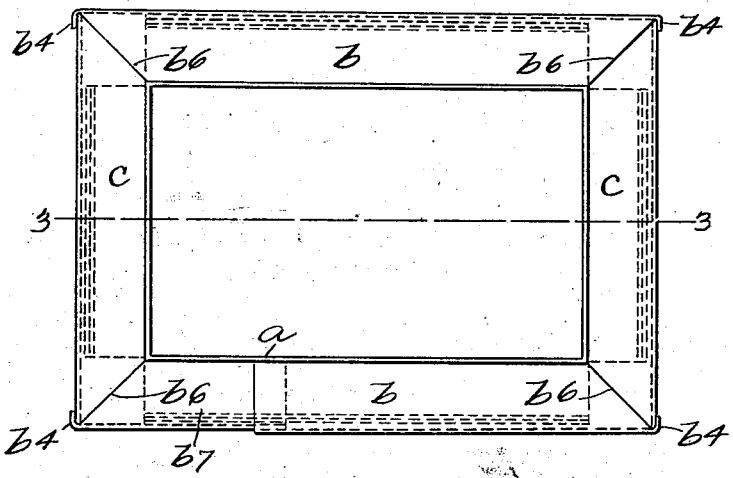
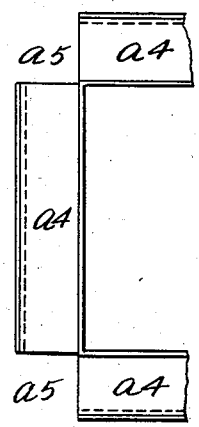
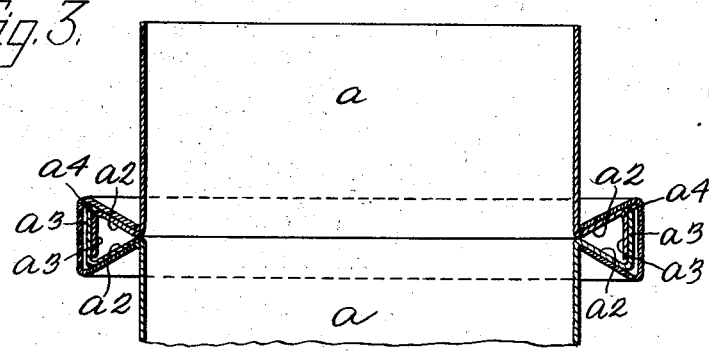
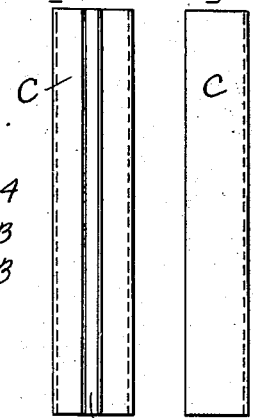
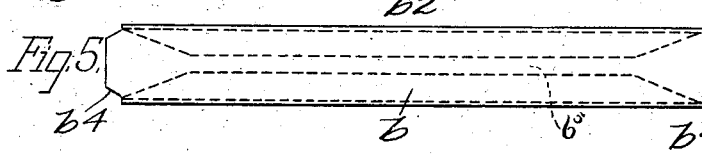
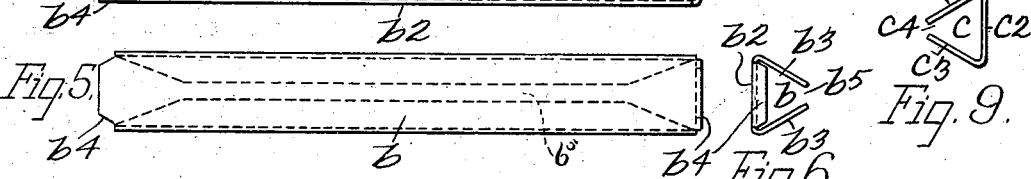
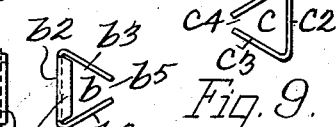
WITNESSES
Alexander Kethel
J. E. Larsen
INVENTORS
Emil Gustav Herman Stein
John Mandel
BY Edgar Tate & Co
ATTORNEYS

UNITED STATES PATENT OFFICE.

EMIL GUSTAV HERMAN STEIN AND JOHN MANDEL, OF NEW YORK, N. Y.

COUPLING FOR AIR-CONDUITS.

SPECIFICATION forming part of Letters Patent No. 726,004, dated April 21, 1903.

Application filed December 6, 1902. Serial No. 134,088. (No model.)

*To all whom it may concern:*

Be it known that we, EMIL GUSTAV HERMAN STEIN and JOHN MANDEL, citizens of the United States, residing at New York, in the county of New York and State of New York, have invented certain new and useful Improvements in Couplings for Air-Conduits, of which the following is a specification, such as will enable those skilled in the art to which it appertains to make and use the same.

The object of this invention is to provide improved means for coupling or connecting the separate joints or sections of pipes or ducts designed for use for ventilating and other purposes, a further object being to provide an improved coupling for the separate joints or sections of rectangular pipes or conduits used for ventilating and other purposes; and with these and other objects in view the invention consists in a coupling of the class specified constructed as hereinafter described and claimed.

The invention is fully disclosed in the following specification, of which the accompanying drawings form a part, in which the separate parts of our improvement are designated by suitable reference characters in each of the views, and in which—

Figure 1 is a plan view of a pipe showing our improvement applied; Fig. 2, a similar view of a part of the construction shown in Fig. 1, but showing the locks of the coupling removed; Fig. 3, a section on the line 3 3 of Fig. 1; Fig. 4, a plan view of one of the locks; Fig. 5, an outside view thereof; Fig. 6, an end view thereof; Fig. 7, an inside view of another form of lock which we employ; Fig. 8, a plan view thereof, and Fig. 9 an end view.

In the drawings forming part of this specification we have shown at $a$ two separate sections of a pipe or conduit, which are rectangular in cross-section and of the form usually employed for ventilating purposes, and these sections of the pipe or conduit are provided at their adjacent ends and at each side with a flange $a^2$, and these flanges diverge and the edges thereof are bent inwardly, so that they form overlapping members $a^3$, by means of which construction there are formed at each side of the pipe or conduit triangular projecting members $a^4$, which are separated at the corners by rectangular spaces $a^5$. We also employ detachable locks, which in the construction shown are of two different forms, and one of these locks is shown in detail in Figs. 4 to 6, inclusive, and the other in Figs. 7 to 9, inclusive.

The locking-piece $b$ (shown in Figs. 4 to 6) is made of sheet metal bent so as to be substantially triangular in cross-section and consists of a back or outer piece $b^2$ and two side pieces $b^3$, and the back or outer part $b^2$ is a little longer at both ends than the side pieces $b^3$ to form projections $b^4$, one of which in the manufacture thereof is bent inwardly and the other left straight, as shown in Fig. 4, and the edges of the side pieces $b^3$ are separated by a narrow longitudinal space $b^5$, and the ends of the side pieces $b^3$ are preferably beveled, as shown at $b^6$.

The other locking-piece $c$ (shown in Figs. 7 to 9, inclusive) is also of the form of the locking-piece shown in Figs. 4 to 6, inclusive, with the exception that it has no end projections, and the ends are preferably cut off straight, and this locking-piece also consists of a back or outer member $c^2$ and two converging side members $c^3$, the edges of which are separated by a longitudinal space $c^4$.

As shown in the drawings, the separate sections of the pipe or conduit are oblong as well as rectangular in cross-section and the locking devices $c$ are used at the narrower sides thereof, while the locking devices $b$ are used at the wider or longer sides thereof, and one of the locking devices $b$ is also composed of two separate parts, one of which is designated in Fig. 1 by the reference character $b^7$ and is adapted to be telescoped into the other part.

In coupling the separate sections or joints of the pipe or conduit the said separate sections or joints are put together, as shown in Fig. 3, and beginning at the left-hand side the locking device $c$ is placed in position, being slid onto the projecting member $a^4$, which is triangular in cross-section. The integral locking member $b$ is then placed in position in the same manner, and the inwardly-directed projection $b^4$ at the end thereof overlaps the locking member or device $c$, which has already been placed. The other locking member $c$ is then placed in position and the corresponding projection $b^4$ bent inwardly thereover, after which the other locking member $b$ or the separate parts thereof are placed in position and the projections $b^4$ bent inwardly, as shown in Fig. 1. This operation locks all of the parts in position, and, if it is desired at any time to disconnect the same, the inwardly-directed projection $b^4$ of the part $b^7$ of one of the locking members $b$ is bent outwardly and said part $b^7$ is telescoped in the other part of the locking member $b$, and all of said locking members may then be detached in the reversed order to that in which they were placed in position. As thus formed it will be seen that the inner surface of the pipe or conduit sections $a$ are smooth and continuous throughout, the coupling or joint being so formed that there is practically no break, and a pipe or conduit made in this manner may be used for ventilating purposes, smoke-flues, and for many other purposes.

Our invention is not limited to the exact means herein shown and described for holding the separate locking parts or members in position, and various changes in and modifications of the construction described may be made without departing from the spirit of our invention or sacrificing its advantages.

Having fully described our invention, what we claim as new, and desire to secure by Letters Patent, is—

1. A coupling for the separate joints or sections, of a pipe or conduit which are rectangular in cross-section, said coupling consisting of triangular projections at the opposite sides of the joints or sections formed partially on one of said joints or sections and partially on the other, and locking devices which are triangular in cross-section and open at one side and adapted to be slipped onto said projections at the opposite ends thereof, two of said locking devices being provided at their ends with projections which are adapted to be bent over the corresponding ends of the other locking device, substantially as shown and described.

2. A coupling for the separate joints or sections of a pipe or conduit which are rectangular in cross-section, said coupling consisting of triangular projections at the opposite sides of the joints or sections formed partially on one of said joints or sections and partially on the other, and locking devices which are triangular in cross-section and open at one side and adapted to be slipped onto said projections at the ends thereof, two of said locking devices being provided at their ends with projections which are adapted to be bent over the corresponding ends of the other locking device, and one of said locking devices being composed of telescoping parts, substantially as shown and described.

3. A coupling for the separate joints or sections of a pipe or conduit which are rectangular in cross-section, said coupling consisting of projections at the opposite sides of the joints or sections and at the abutting ends thereof and formed partially on one of said joints or sections and partially on the other and triangular in cross-section, and locking devices open at one side and triangular in cross-section and adapted to be slid onto said projections, substantially as shown and described.

4. A coupling for the separate joints or sections of a pipe or conduit which are rectangular in cross-section, and comprising projecting flanges formed on the abutting ends of the separate joints or sections and bent at an acute angle to said joints or sections and provided with overlapping members and forming at the sides of the said joints or sections projections which are triangular in cross-section, and locking members adapted to be slipped onto said projections at the ends thereof, substantially as shown and described.

5. A coupling for the separate joints or sections of a pipe or conduit which are rectangular in cross-section, and comprising projecting flanges formed on the abutting ends of the separate joints or sections and bent at an acute angle to said joints or sections and provided with overlapping members and forming at the sides of the said joints or sections projections which are triangular in cross-section, and locking members adapted to be slipped onto said projections at the ends thereof, said locking members being triangular in cross-section and open at one side, substantially as shown and described.

In testimony that we claim the foregoing as our invention we have signed our names, in presence of the subscribing witnesses, this 3d day of December, 1902.

EMIL GUSTAV HERMAN STEIN.
JOHN MANDEL.

Witnesses:
FRED. UHLEMANN,
JACK MANDEL.